Patented Nov. 6, 1923.

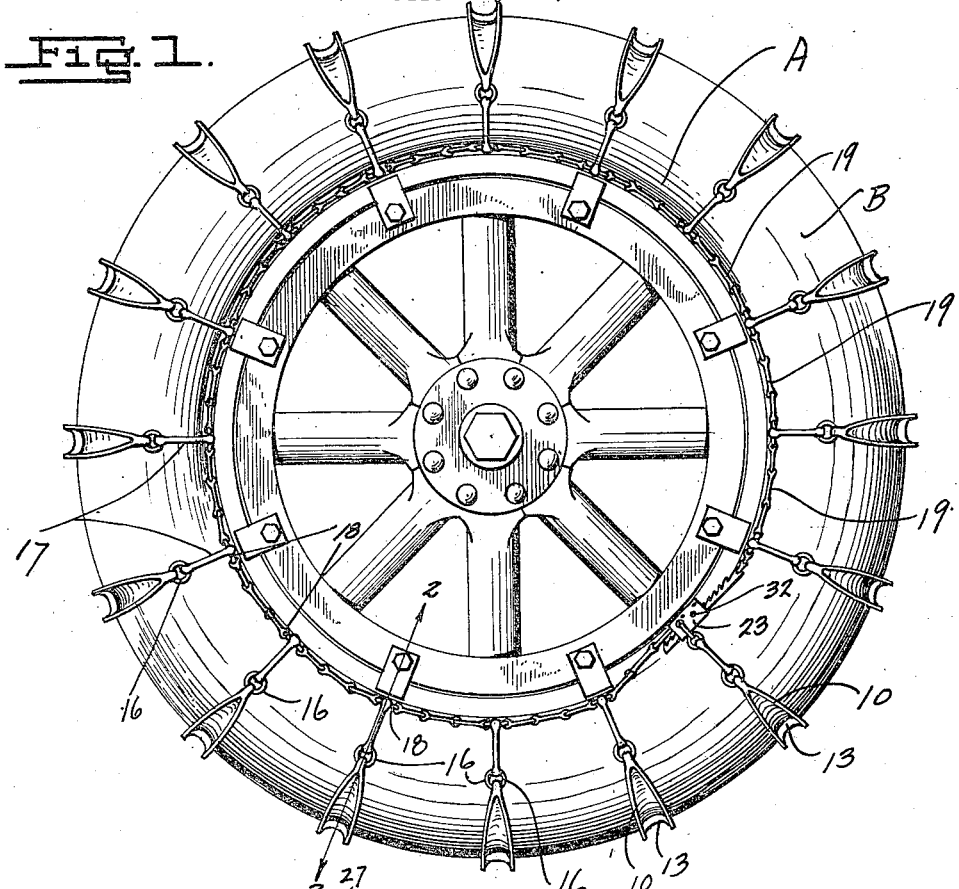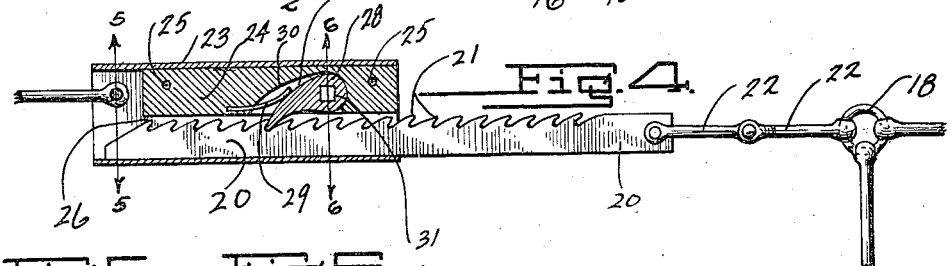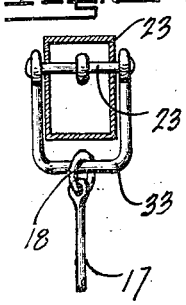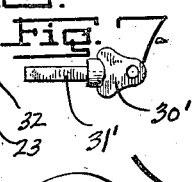

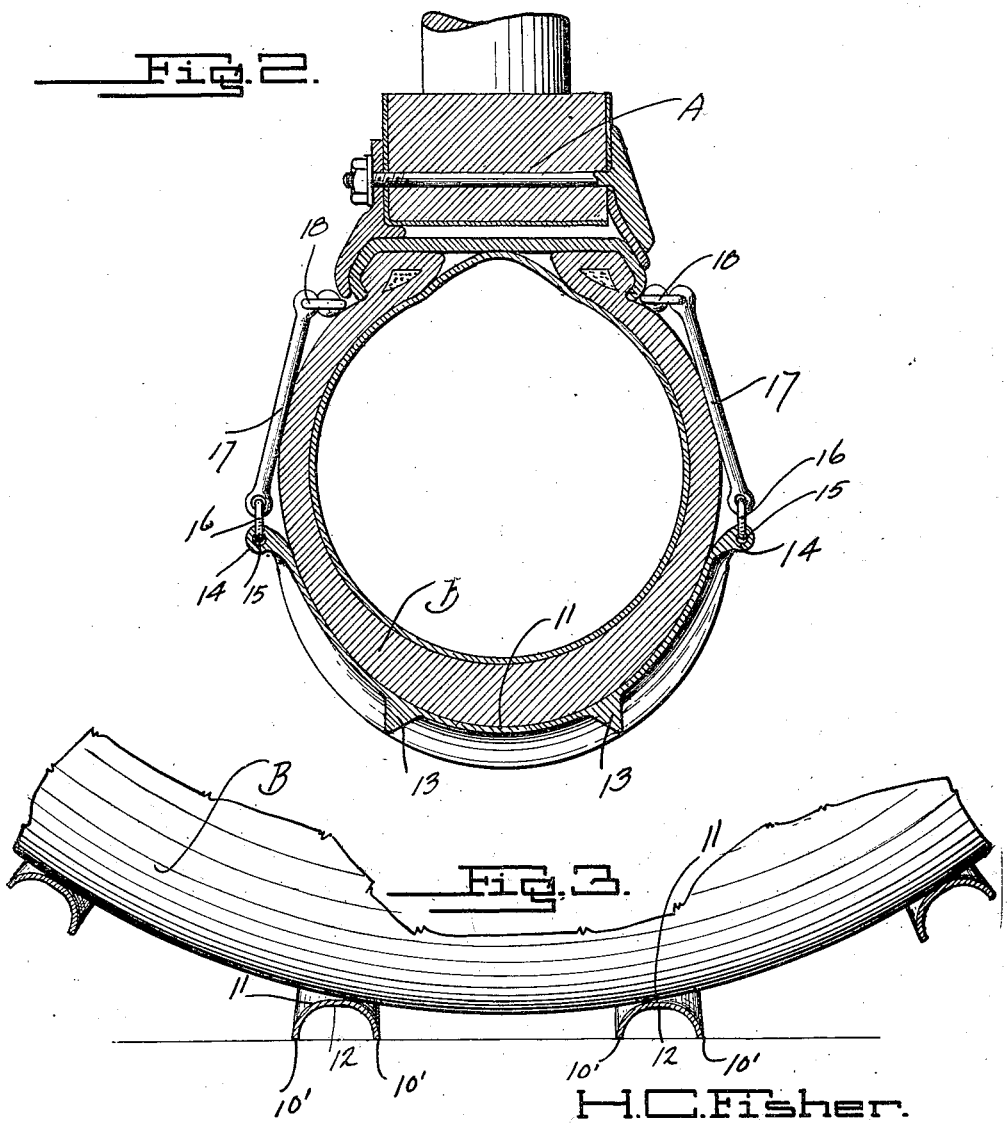

1,473,340

UNITED STATES PATENT OFFICE.

HAROLD C. FISHER AND THEODORE O. CLARK, OF LONE STAR, KANSAS.

TIRE CHAIN.

Application filed May 10, 1920. Serial No. 380,404.

*To all whom it may concern:*

Be it known that we, HAROLD C. FISHER and THEODORE O. CLARK, citizens of the United States, residing at Lone Star, in the county of Douglas and State of Kansas, have invented certain new and useful Improvements in Tire Chains, of which the following is a specification.

My invention relates to adjustable tire chains for vehicle wheels and particularly that type of tire chain used upon resilient tires.

An important object of my invention is the provision of a tire chain of the above described character having a traction element so constructed as to prevent lateral and longitudinal slipping upon the road.

A further object of the invention is to provide a device of the above described character which will permit of correct adjustment or tensioning of the chain about the tire, A further object of the invention is to provide a device of the above described character having its parts so designed as to effect a minimum of wear upon the tire, and at the same time be substantially and durably constructed.

Other objects and advantages of the invention will be apparent during the course of the following description.

In the accompanying drawings forming a part of this specification and in which like numerals are employed to designate like parts throughout the same, Figure 1 is a side elevation of a vehicle wheel having a pneumatic tire thereon, and equipped with the adjustable tire chain.

Figure 2 is a transverse cross section through the tire and a longitudinal cross section through a traction element showing its construction and means of attachment to the tire chain links.

Figure 3 is a fragmentary side elevation of the tire and a transverse cross section of the traction element.

Figure 4 is a fragmentary cross sectional view of the tire tensioning means, showing its attachment to the tire chain links.

Figure 5 is a cross sectional view taken on the line 5—5 of Figure 4.

Figure 6 is a cross sectional view taken on the line 6—6 of Figure 4.

Figure 7 is an elevation of a key for releasing the tire chain tensioning means.

In the drawings, wherein for the purpose of illustration is shown a preferred embodiment of my invention, the letter A designates an ordinary type of vehicle wheel having a pneumatic tire B thereon.

The numeral 10 designates generally the tractive elements of my invention, said tractive elements being substantially concavo convex throughout their length and so designed as to snugly fit the tire crown and sides as shown in Figure 2 of the drawings. The tractive elements 10 are also concavo convex in transverse cross section, the inner or convex side 11 of the transverse cross section being adjacent the tire for permitting slight rocking movement of the traction element thereon, this rocking movement taking place when the vehicle wheel is rolling over the ground and the outstanding parts 10' come into contact with the ground. The outer or concave side of the transverse cross section 12 have ribs 13 spanning the concavity, the same being intermediate the ends of the tractive element and preferably located one on each side of the transverse center line of the traction element, the ribs being substantially pyramidal in cross section and provided to prevent lateral skidding or side slipping of the vehicle. The traction elements 10 are of greatest concavo convex cross section on its transverse center line and diminishing toward its ends 14 to a uniform cross section. The ends 14 are provided with apertures 15 for the reception of circular rings 16, the side rings being rotatably mounted therein. Bar links 17 of substantially uniform cross section throughout their length are likewise movably connected to the circular rings 16 and are similarly connected at their opposite ends to circular rings 18. The rings 18 are flexibly connected and held in spaced relation by a series of bar links 19, preferably of uniform cross section throughout their length and constructed similar to bar links 17, thus forming the tire chain.

It is preferred that the rings 16 and 18 be constructed to form a true circle and also preferably circular in cross section, it having been found that the junctures where they exist are the places of greatest strain and wear. The circular rings 16 and 18 being movably mounted in all their connecting parts are free to rotate within them, thus conserving the life of the junction elements 16 and 18 and consequently the life of the tire chain.

Racks 20 each having teeth 21 thereon are connected to the circular rings 18 formed upon an end of the tire chain by intermediate links 22, the racks being so arranged on the same end of the tire chain as to be disposed upon opposite sides of the tire B. Casings 23, being substantially rectangular in cross section, and having both ends of each casing open, are pivotally connected by pins 23' to the bar links 19, upon the opposite end of the tire chain. The casings 23 have guide blocks 24 provided therein and secured thereto as by rivets 25, the said guide blocks 24 being so situated within the casings 23 as to allow a space 26 for the entrance and exit of the tooth racks 20, and are provided with recesses to serve as seats and guides for pawls 28. The guide blocks 24 are also provided with spring clips 29, normally working upon the cam face 30 of the pawls 28 to force the pawls into engagement with the teeth 21 of the racks 20. The pawls 28 are preferably provided with square key ways 31 for the reception of a key 30' having a square shank 31', to disengage the pawls from the teeth of the racks 20 thus allowing the withdrawal of the racks 20 from the casings 23 and the removal of the tire chain from the vehicle wheel. The casings 23 are provided with apertures 32 to facilitate entrance of the key 30' into the keyway 31.

It is preferred that a tractive element be connected directly to the casings 23 in order to allow greater adjustments to fit different sizes of tires. To effect this the circular rings 18 of the tractive elements are movably attached to the U-shaped members 33, the said members being pivotally connected to the casings 23 by pin 23'.

In operation the tire chain is placed circumferentially about the tire of the vehicle wheel and the racks 20 and their companion casings 23 being placed upon opposite sides of the tire. The racks 20 are then inserted into their respective casings, the teeth 21 of the rack pushing the pawls 28 back against expansion of the spring 29 until the tire chain has been tensioned to properly place the tractive elements 10 in spaced relation. As the vehicle wheel rolls over the ground, the outstanding portions 10' of the tractive elements 10, first coming in contact with the surface over which the vehicle wheel is rolling causes the tractive element to rock slightly due to the flexibility of the chain. The convex side 11 of the transverse section being adjacent the tire rocks evenly upon it as is clearly shown in Figure 3 of the drawings, thus resulting in a minimum of wear upon the tire.

It may be desired to increase or decrease the length of the chain, the links 22 are therefore provided to meet this contingency.

It is to be understood that the form of my invention herewith shown and described is to be taken as a preferred example of the same, and that various changes in the shape, size and arrangement of parts may be resorted to without departing from the spirit of the invention or the scope of the subjoined claims.

We claim:

1. As an article of manufacture, a traction element concavo convex throughout its length, and regularly concavo convex in transverse cross section substantially the entire length thereof, said element being of greatest concavo convex cross section on its transverse center line and gradually diminishing toward its ends to a relatively small uniform cross section.

2. In a tire chain, the combination of a plurality of traction elements, each of said traction elements being concavo convex throughout its length to snugly fit the tire, and concavo-convex in transverse cross section substantially throughout the length thereof, the apex of said last mentioned convexity being on the longitudinal axis of said traction element and adapted for normally abutting the tire, said last mentioned convexity being regularly formed from side to side of said traction element to permit rocking thereof upon a tire, the transverse cross section of each of said elements being greatest intermediate the ends thereof, and from which point the cross section gradually diminishes toward the ends thereof; and flexible means for securing the traction elements in spaced relation upon the tire for rocking movement.

3. In a tire chain the combination of a plurality of traction elements, circular rings connected to the ends of the traction elements to permit free rotation of the rings, bar links connecting said rings, circular rings connecting the opposite end of the said bar links and freely rotatable with respect thereto, and a plurality of bar links connected to said last mentioned circular rings and holding the traction elements in spaced relation.

4. In a tire chain, the combination of a plurality of traction elements having the tire abutting portions thereof rounded, circular rings connected to the ends of said traction elements to permit free rotation with respect to their mounting in the traction elements, bar links connected at their ends to said rings, circular rings connected to the other ends of said bar links and freely rotatable with respect to their mounting therein, and flexible connecting means for engaging the last mentioned circular rings on the ends of said bar links, whereby the traction elements may be mounted in spaced relation upon a tire.

HAROLD C. FISHER.
THEODORE O. CLARK.